United States Patent
Atkins et al.

(10) Patent No.: US 6,504,825 B1
(45) Date of Patent: Jan. 7, 2003

(54) METHOD AND SYSTEM FOR LOCATING DEVICES DURING SYSTEM ADMINISTRATION

(75) Inventors: Barry Douglas Atkins, Raleigh, NC (US); David Carroll Challener, Raleigh, NC (US); Richard Cheston, Morrisville, NC (US); John Karidis, Ossining, NY (US); Frank P. Novak, Raleigh, NC (US); Joseph P. McGovern, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/272,071

(22) Filed: Mar. 18, 1999

(51) Int. Cl.⁷ ................................................. H04J 15/00
(52) U.S. Cl. .................................. 370/254; 340/825.49
(58) Field of Search ................................ 700/225, 226; 340/825.49, 825.36; 370/254; 342/419; 379/38, 45, 373.02, 376.01

(56) References Cited

U.S. PATENT DOCUMENTS

| | | | | |
|---|---|---|---|---|
| 4,477,697 A | * | 10/1984 | Judd et al. | 379/373.02 |
| 4,751,729 A | * | 6/1988 | Coleman | 379/376.01 |
| 5,266,944 A | * | 11/1993 | Carroll et al. | 340/825.36 |
| 5,339,351 A | * | 8/1994 | Hoskinson | 379/45 |
| 5,461,390 A | * | 10/1995 | Hoshen | 342/419 |
| 5,519,760 A | * | 5/1996 | Borkowski et al. | 340/825.49 |
| 5,870,453 A | * | 2/1999 | Shapiro | 379/38 |
| 5,926,463 A | * | 7/1999 | Ahearn et al. | 370/254 |
| 6,052,812 A | * | 4/2000 | Chen et al. | 714/751 |

OTHER PUBLICATIONS

Markus G. Kuhn et al., "Soft Tempest: Hidden Data Transmission Using Electromagnetic Emanations", Second Workshop on Information Hiding, Portland, Oregon, Apr. 1998, pp. 1–18.

* cited by examiner

Primary Examiner—Salvatore Cangialosi
(74) Attorney, Agent, or Firm—Carlos Munoz-Bustamante; Bracewell & Patterson, LLP (57) ABSTRACT

A system for mapping a location of an electronic equipment in a defined area. The system comprises of a server which is typically a data processing system. An activation signal is sent to the electronic equipment. In response to the activation signal, the electronic equipment emits a pre-defined signal containing a unique signature of the electronic equipment. The signal is captured by a device connected to the server with a known location in the defined area. The server utilizes the known location of the device along with the unique signature of the electronic equipment to identify/determine the location of the electronic equipment.

22 Claims, 4 Drawing Sheets

METHOD AND SYSTEM FOR LOCATING DEVICES DURING SYSTEM ADMINISTRATION

BACKGROUND OF THE INVENTION

1. Field of the Invention

The present invention relates in general to internal system administration utilizing a data processing system and in particular to an automated mapping system to find the location of electronic equipment located within a defined area. Still more particularly, the present invention relates to a system and method for determining the physical location of electronic equipment in a defined area utilizing a server network comprising of a data processing system and a phone network or electromagnetic frequency (EMF) equipment.

2. Description of the Related Art

Personal data processing systems have attained widespread utilization for providing computing power to many segments of today's modern society. Personal data processing systems include a desk top, floor standing, or portable microcomputer that consists of a system unit having at least one system processor and associated volatile and nonvolatile memory, a display monitor, a keyboard,.one or more diskette drives, a fixed disk storage, and an optional printer. These systems are designed primarily to give independent computing power to a single user and are inexpensively priced for purchase by individuals or small businesses.

Typically, a business is located within a physical facility or structure and has many data processing systems distributed throughout various locations within the physical facilities. Keeping track of the physical location of each data processing system is difficult. The difficulty in maintaining an accurate record of each data processing system's current physical location greatly increases as the number of data processing systems increases. Contributing to this problem is the likelihood that at least some of these computer systems will be moved from one location to another.

Significant costs are associated with asset tracking of data processing systems in a large business environment. Presently, this tracking is implemented manually with runners locating and inventorying each individual system. Not only is this method inefficient, but it is also extremely costly.

Often data processing systems are interlinked to form a network. These locally controlled networks known also as local area networks (LAN) typically consist of a server which acts as the administrator or brain of the network. The individual data processing units are linked to the server via a line connection such as an ethernet connection. The general setup of a LAN is well known in the art.

In networked data processing systems, each network server and interlinked data processing unit is associated with a unique address. This address is the Internet Protocol (IP) address. This address allows for communication between the data processing systems. The IP address of the data processing system is not associated with a physical location. Therefore, if the data processing system is moved to a new physical location, its IP address may remain the same, but the record of the physical location of the data processing system becomes inaccurate.

Universal unique identifiers (UUIDs) are well known in the PC industry. Each data processing system has a unique UUID which may be its serial number or other set of characters. Utilizing the UUIDs, each data processing system may be uniquely identified. As with the IP address, however, the UUID associated with a particular data processing system identifies the data processing system, but not its physical location. If a data processing system is moved, determining its physical location at a later date requires a manual search.

Thus, one of the main problems that is faced by system administrators today is determining the location of the various pieces of equipment that may or may not be network attached. This can be an expensive problem, with a large number of man hours utilized to inventory PC equipment.

Therefore, it would be desirable to have a system and method for determining a physical location of a data processing system within a defined area in an efficient and inexpensive manner. It would also be desirable to have a system and method for finding the physical location of an electronic equipment based on known identifying information of the electronic equipment utilizing a simple system server and locally placed reception devices.

SUMMARY OF THE INVENTION

It is therefore one object of the present invention to provide a method and system for an internal system administration utilizing a data processing system.

It is another object of the present invention to provide a method and system for an automated mapping system to find the location of electronic equipment located within a defined area.

It is yet another object of the present invention to provide a method and system for determining the physical location of electronic equipment in a defined area utilizing a server network comprising of a data processing system and a phone network or electromagnetic frequency (EMF) equipment.

The foregoing objects are achieved as is now described. A system for mapping a location of an electronic equipment in a defined area is disclosed. The system includes a server which is typically a data processing system. An activation signal is sent to the electronic equipment. In response to the activation signal, the electronic equipment emits a predefined signal containing a unique signature of the electronic equipment. The signal is captured by a device connected to the server with a known location in the defined area. The server utilizes the known location of the device along with the unique signature of the electronic equipment to determine the location of the electronic equipment.

In the preferred embodiment, the electronic device is a data processing system and it is connected to the server via a LAN. Further, detection means include a phone system utilizing audio tones or an EMF receiver.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
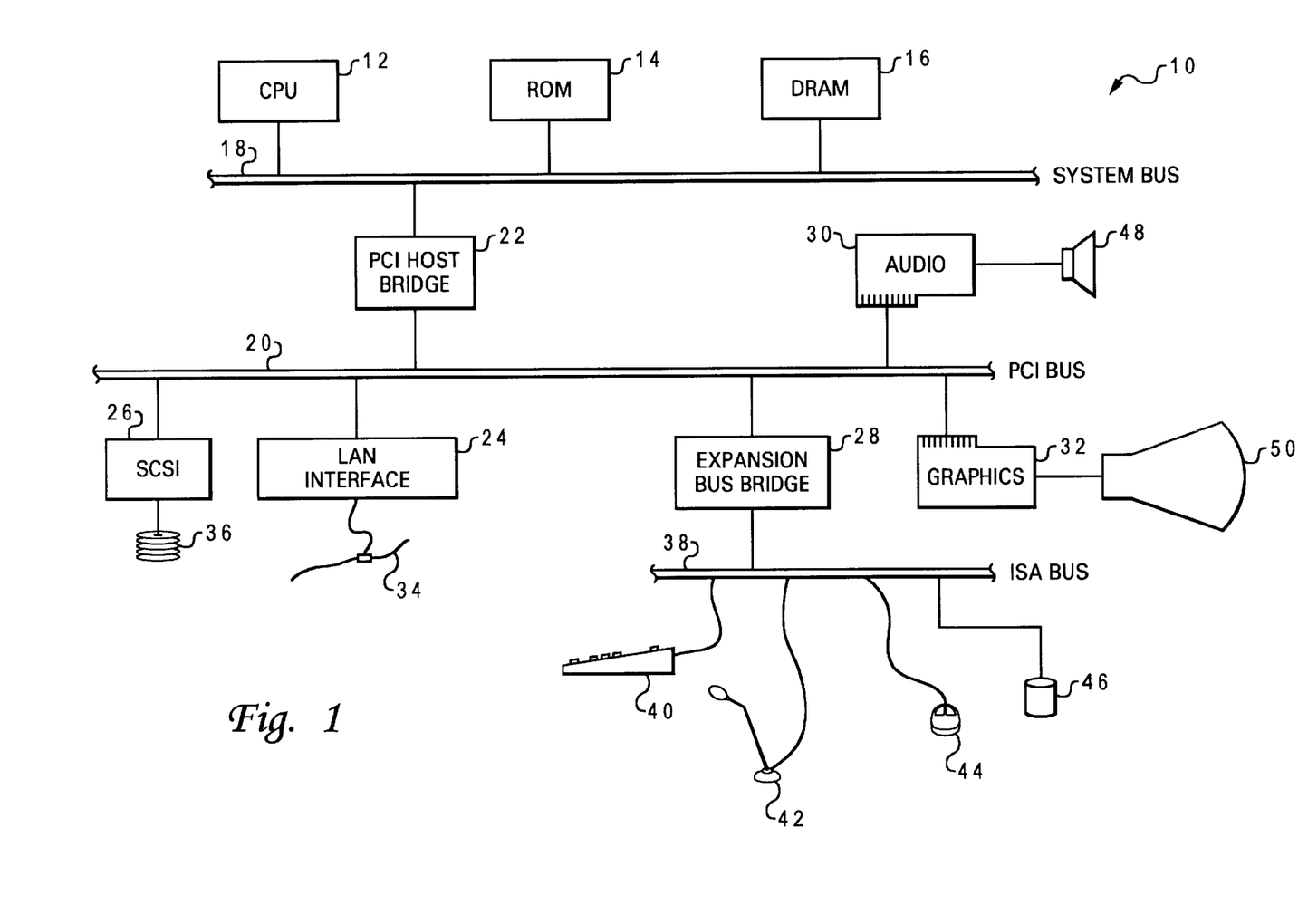
FIG. 1 depicts a block diagram representation of a data processing system which may be utilized to implement both the server and client data processing system in accordance with a preferred embodiment of the present invention.

With reference now to the figures, and in particular with reference to FIG. 1, there is depicted the basic structure of a data processing system 10 utilized in the preferred embodiment of the invention. Data processing system 10 includes a central processing unit (CPU) 12, firmware or read-only memory (ROM) 14, and a dynamic random access memory (DRAM) 16 which are all connected to a system bus 18. CPU 12, ROM 14 and DRAM 16 are also coupled to a PCI local bus 20 utilizing a PCI host bridge 22. PCI host bridge 22 provides a low latency path through which processor 12 may access PCI devices mapped anywhere within bus memory or I/O address spaces. PCI host bridge 22 also provides a high bandwidth path to allow the PCI devices to access DRAM 16.

Attached to PCI local bus 20 are a local area network (LAN) adapter 24, a small computer system interface (SCSI) adapter 26, an expansion bus bridge 28, an audio adapter 30, and a graphics adapter 32. Lan adapter 24 is utilized to connect data processing system 10 to an external computer network 34. SCSI adapter 26 is utilized to control high-speed SCSI disk drive 36. Expansion bus bridge 28 is utilized to couple an ISA expansion bus 38 to PCI local bus 20. As shown, several user input devices are connected to ISA expansion bus 38, including a keyboard 40, a microphone 42, and a graphical pointing device (mouse) 44. Other devices may also be attached to ISA expansion bus 38, such as a CD-ROM drive 46. Audio adapter 30 controls audio output to a speaker 48, and graphics adapter 32 controls visual output to a display monitor 50.

In the preferred embodiment of the invention, communication to the data processing system is made possible via a modem connected to a land line (telephone system) which is in turn connected to a network server. Alternatively, data processing system may be connected to a network via an ethernet/network card or LAN adapter. Communicated data arrives at the modem or network card and is processed to be received by the data processing system's CPU or other software application.

Those skilled in the art will further appreciate that there are other components that might be utilized in conjunction with those shown in the block diagram of FIG. 1; for example, a display adapter connected to data processing system might be utilized to control a video display monitor. The display adapter is connected to a video card which along with the displayed data may be monitored for electromagnetic frequency (EMF) radiation during one implementation of the invention. Additionally, coupled along input/output (I/O) bus may be a variety of I/O components such as a video signal processor which is associated with video RAM (VRAM) for storing graphic information and for storing image information. Video signals exchanged with the processor may be passed through a digital-to-analog converter (DAC) to a monitor or other display device. Data processing system also includes firmware whose primary purpose is to seek out and load an operating system from one of the peripherals (usually permanent memory device) whenever the data processing system is first turned on.

Additionally, data processing system contains an audio recognition software and hardware such as a microphone, and audible output hardware such as a speaker, to enable reception of audio signals and transmittal of audio signals.

The present invention is a system and method for determining a physical location of an electronic equipment located within a defined physical area. In the preferred embodiment, the electronic equipment is a data processing system. All of the embodiments described herein will be described with reference to a data processing system as the electronic equipment being located. It is understood by those skilled in the art that other types of electronic equipment capable of generating signals may be interchanged with the data processing system as utilized in the following embodiments. In the preferred embodiment, the data processing system (hereinafter referred to as client or client data processing system) is coupled to a server data processing system (hereinafter referred to as server) to form a local area network (LAN).

During implementation of the invention, several different embodiments of the invention are possible. Each embodiment has unique characteristics but may be generally grouped into two classes based on the preferred methods of detecting the data processing system. The first detection method utilizes the phone network and the second utilizes EMF equipment. In either case, the detecting method or system is connected to the server and its location is known to the server. The server therefore places the located data processing system on a map of the location. This map represents the map of the detecting equipment locations, respectively. A third method of locating the data processing system is also disclosed utilizing software resident on a data processing system. This method is less automatic than the two general classes which include detection.

A. Locating Devices Via Audible Tones

The preferred embodiment of this invention makes utilization of the telephone infrastructure to assist in automatically locating and/or identifying devices throughout a building. The basic idea is to enable the data processing system (or other electronic devices) to communicate with nearby telephones through audible and/or radio frequency (RF) mechanisms and then to make utilization of the generally well-known locations of the telephones to determine the location of the PCs. In the preferred embodiment of the invention, the infrastructure of a private branch exchange (PBX) phone system is utilized.

Private branch exchanges (PBXs), often referred to interchangeably as private automatic branch exchanges (PABXs), are commonly employed by enterprises including hotels, large businesses, and government offices to provide external communications access to and from individual enterprise employees. A PBX typically includes a private switch, usually on the enterprise's premises, connected to a common group of lines or trunk circuits running from one or more central offices to provide communications service to a number of individual phones. Virtually all PBXs in North America are PABXs, where the terms are utilized interchangeably; however operator-assisted PBXs are still employed outside North America.

Within a PBX, calling parties simply dial a three or four digit extension to connect to a called party also within the PBX. Additionally, PBXs can be placed in listening mode while still on hook, a feature utilized within the preferred embodiment. The advantage this has is that it allows the utilization of the phone system (which has a well defined location) to be utilized to identify locations of PC hardware.

Figure 2:
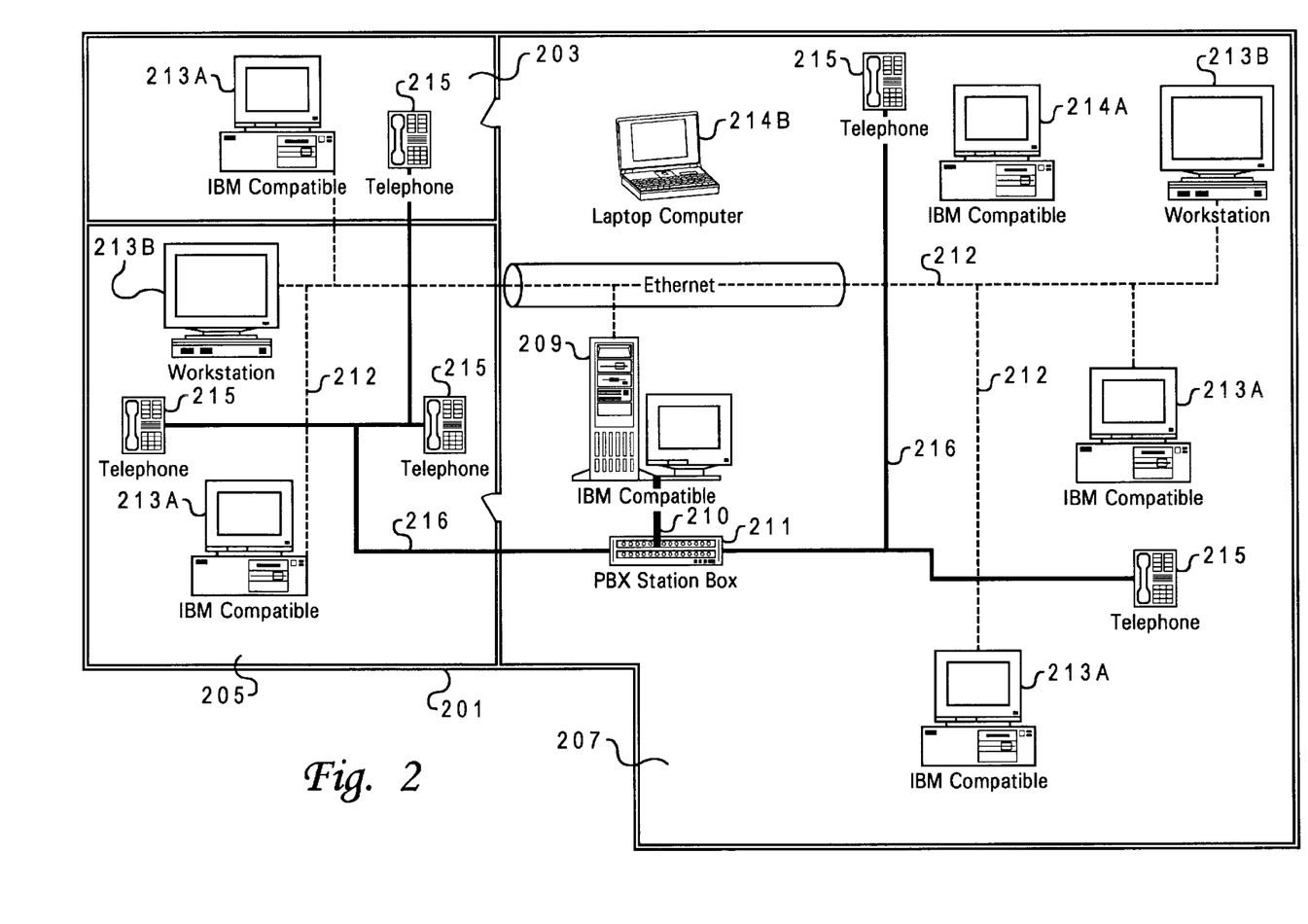
FIG. 2 depicts a block diagram representation of a physical layout of an area containing a LAN and stand alone data processing systems and a phone network in accordance with the preferred embodiment of the present invention.

FIG. 2 depicts a pictorial representation of a building or facility 201 and first, second and third sectioned areas 203, 205, and 207, respectively which may represent offices or carrels. Located within building 201 is a LAN comprising server 209 and several connected data processing systems 213A or workstations 213B. Data processing systems 213A or workstations 213B are connected to server 209 via an ethernet connection 212. As depicted, the preferred form of the network conforms to the Ethernet specification. It will be appreciated, however, that other forms of networks, such as token ring, may be utilized to implement the invention.

Building 201 also contains several stand alone data processing systems 214A including a laptop 214B. Laptop 214B, workstation 213B, stand alone data processing system 214A and data processing system 213A are hereinafter collectively referred to as data processing system 213A, 213B, 214A, and 214B. Additionally, building 201 contains a telephone network comprising of individual phone units 215 connected to a PBX station box 211 via a phone line 216. PBX station box 211 is connected to server 209 via connection trunking 210 which permits receiving and sending of data/signals from and to server 209 and phone network respectively. The three areas depicted within building 201 represent three possible configurations of the ratios of phone units 215 to data processing systems 213A, 213B, and 214A, 214B in a given area. Where more than one phone unit 215 is located in an area with one or more than one data processing system 213A, 213B, 214A, and 214B, as in second sectioned area 205 and third sectioned area 207, triangulation is performed at the server to determine the location of the signal received via phone units 215. The utilization of phone units 215 as is depicted in this illustration represents the detection via audible tones. In another embodiment depicting detection via EMF radiation, these phone units are replaced with EMF receivers.

Although the invention has been presented with a LAN comprising a server, other forms of networks, such as a peer-to-peer network are contemplated as falling within the coverage of the invention. A LAN with a server is utilized solely for illustrative purposes and its utilization is not meant to be seen as a restriction on the invention.

In one embodiment of the invention, the method of communication between the data processing system and the telephone is the utilization of audible beeps and tones, either generated by the PC and received by the telephone, or generated by the telephone and received by the data processing system. During implementation of the invention, each data processing system provides audible tones which correlate to characters. In the preferred embodiment, these characters are numeric characters (0–9) which represent the unique signature. Additionally, in one embodiment, the phone signal is a predetermined sequence of numbers which yield a tone recognized by the data processing system as an activation tone.

The preferred embodiment is implemented in locating equipment that is LAN connected and has a microphone and is near a PBX phone. A system administrator sets a special phone ring which is understood by the data processing system to instantiate transmission of its unique identification data. The system administrator sets a time, when the phone lines are dialed, one by one. The time selected is generally one when most of the users of the phone units and the data processing system are away from the location. Prior to beginning to dial the phone, a wake up signal is sent on LAN to ensure that all the data processing systems connected to the server are powered "ON" or activated. Once the phones ring, the data processing systems are able to hear the ring (through the microphone or other hardware), and immediately sends the system administrator a message giving their serial number and IP address. This message is sent via the LAN ethernet connection to the server. The server then matches the received data with the location of the phone.

Another embodiment of the invention locates equipment that may or may not be LAN connected and near a phone line. Again, the system administrator knows where the phones are located, though he does not know where the LAN ports are. For the purposes of this embodiment, if a data processing system is not LAN connected, it is assumed to be ON.

This embodiment takes advantage of the fact that most PBXs can be put into a listen mode even when they are on the hook. Those skilled in the art of phone communications are familiar with this functionality of PBX phones. A LAN signal (or late at night software signal) is sent to the computer, telling it to transmit its serial number via tones generated by the data processing system, over the data processing system speaker. In this embodiment, data processing systems which are not LAN connected are loaded with particular software which signals the data processing system to begin transmitting its information at a predetermined time. The phones are then scanned to determine what serial numbers are near which phones. In the preferred embodiment, the data processing system also transmits its IP address. If the data processing system is hooked to the network server, the network server then sends it a signal over LAN telling it to be quiet, once its location is determined.

Another embodiment of the invention locates equipment that is not LAN connected, but is on and has a microphone, and is near a PBX phone. In this embodiment, the phone lines are dialed at a selected time. The data processing system hears the signal ring. The PBX central server then begins to listen on that phone line utilizing the phone's on-hook listening capability. The data processing system waits until the initiating phone ring is completed and transmits to the phone a signal, (in tones) indicating its serial number (and P address, if any).

In one embodiment, utilized for locating equipment that is near a PBX phone and is on, a beep from the phone or a phone ring operates as a trigger for the data processing system to transmit its signal. In this embodiment, the data processing system is designed to utilize audible feedback to transmit (over the phone line) their serial number upon receiving a particular beep. This embodiment works well on machines that have embedded sound cards and microphones.

One embodiment of the invention is implemented when a stand alone data processing system is in sleep mode (also referred to as standby mode or resume mode.) In this situation the preferred embodiment utilizes a device to wake up the system. In the preferred embodiment, this device wakes up the system only if: 1) it hears, very specifically, a telephone ring, and 2) it is after a preselected time or at a predetermined time. Also in the preferred embodiment, a second ring is utilized to turn the device off.

In this embodiment, the device is not physically connected to the phone or the data processing system. Rather the device is a module tuned to listen for a phone ring, that also has a timer in it utilized to activate the system. In this embodiment, this module is utilized to turn on those systems that are not hooked to the LAN, or which do not have wake on LAN hardware installed. Those skilled in the art are familiar with devices capable of activating a data processing system from sleep or standby mode without having to reboot the entire system by providing operands and hardware which respond to certain external triggers.

Regardless of which communication method is used to enable the data processing system and the phones to signal each other, it is likely that multiple phones may be within communication range of multiple data processing systems as depicted in FIG. 2. This scenario is especially likely in the case of open floor plan offices. In this situation, in the preferred embodiment, the server triangulates to find data processing systems that "hear" more than one phone (or phones that hear more than one data processing system). The strength (amplitude) of the received signal is measured making such triangulation much easier. However, if server is without this capability, the system determines a perimeter of phones in which to search for a particular PC in the preferred embodiment.

B. Locating Devices Via Disabling Data Processing System

One software implemented embodiment of the invention utilizes a software program which locks the data processing system. This embodiment may be utilized in a LAN connected system. Periodically the system administrator sends a message to each data processing system on the LAN. This message would, together with software running on the system, disable the system by coming up with a graphical user interface (GUI) that will not go away until the user types in the location of the system in the GUI. In this embodiment, at this point, a message containing the typed location is sent back to the server, where the information is compiled and stored. The server then messages the software to enable the data processing system and the GUI goes away.

This embodiment may also utilized for locating equipment that is not LAN connected and not near a phone. Periodically a software program locks the data processing system and requires a password to unlock the system again. In this embodiment, the password is a hash of the data processing system serial number, both displayed on the screen along with a note to send the information to the system administrator as to the location of the data processing system. In this embodiment, upon receipt of this information the system administrator/server will return the password to unlock the system so it can further be utilized.

C. Locating Devices Via EMF Reception

In one embodiment of the invention, EMF signals are utilized in the detection stage of the invention. Utilization of EMF allows the detection of signals from a data processing system monitor or video output over longer distances and does not require audible signaling. The data processing system generates radio frequency (RF) signals during operation which are received utilizing a radio receiver attached to the telephone in this embodiment.

Technical information on how to accomplish this latter approach is disclosed in *"Soft Tempest: Hidden Data Transmission Using Electromagnetic Emanations"*, published by M. Kuhn and R. Anderson in 1998. This technical paper discloses how to capture EMF radiation from a video screen and reconfigure the radiation to reveal the data emitted. Traditionally, the electromagnetic broadcast of data has been a significant concern in sensitive computer applications. The present invention, however, does not concern itself with the security aspects as does the paper. Instead, the invention utilizes this ability within its network to determine the location of devices.

In this embodiment, the transmission of the EMF signals may be done via the video card, without the monitor on, although the transmission strength is much reduced. This embodiment also requires an additional hardware component. This component is a simple receiver for the EMF (such as a radio receiver) which is connected to the phone line. Additionally, the data processing system must be loaded with the necessary software to transmit utilizing its video card.

Specifically in this embodiment, utilization is made of the electromagnetic radiation generated by data processing systems which contain leaked information about the data being processed. This radiation is known within the art as "compromising emanations" or "Tempest radiation." The radiation is captured by the EMF receiver. It carries a faint secondary signal which is recovered by signal processing equipment connected to the server. In the present embodiment, the server deciphers the EMF signals captured by first digitizing the signal with its sound card. The remaining steps involve symbol detection, synchronization and decoding as is known by those skilled in the art of digital communications or signal processing. Those skilled in the computer arts are aware that modern data processing systems contain the hardware necessary to perform digital signal processing and analog to digital conversion as utilized within the various embodiments of this invention.

In this embodiment, even very weak traces of the processed information can be identified in electric, electromagnetic and acoustic emanations by averaging correlation values over a large number of samples. Further in this embodiment, the data processing systems are programmed to execute algorithm which displays and transmits signals which includes the unique signature desired captured.

The embodiment is further implemented in environments where data processing systems are not turned off at night, a habit encouraged by the power management features of modern systems. If monitors are also left powered up, then they could be program to display the required signals at a given time synchronized with the reception time of the receiver. Where monitors are turned off but the data processing system is not, a serviceable signal can usually be picked up via the video card.

Figure 3A:
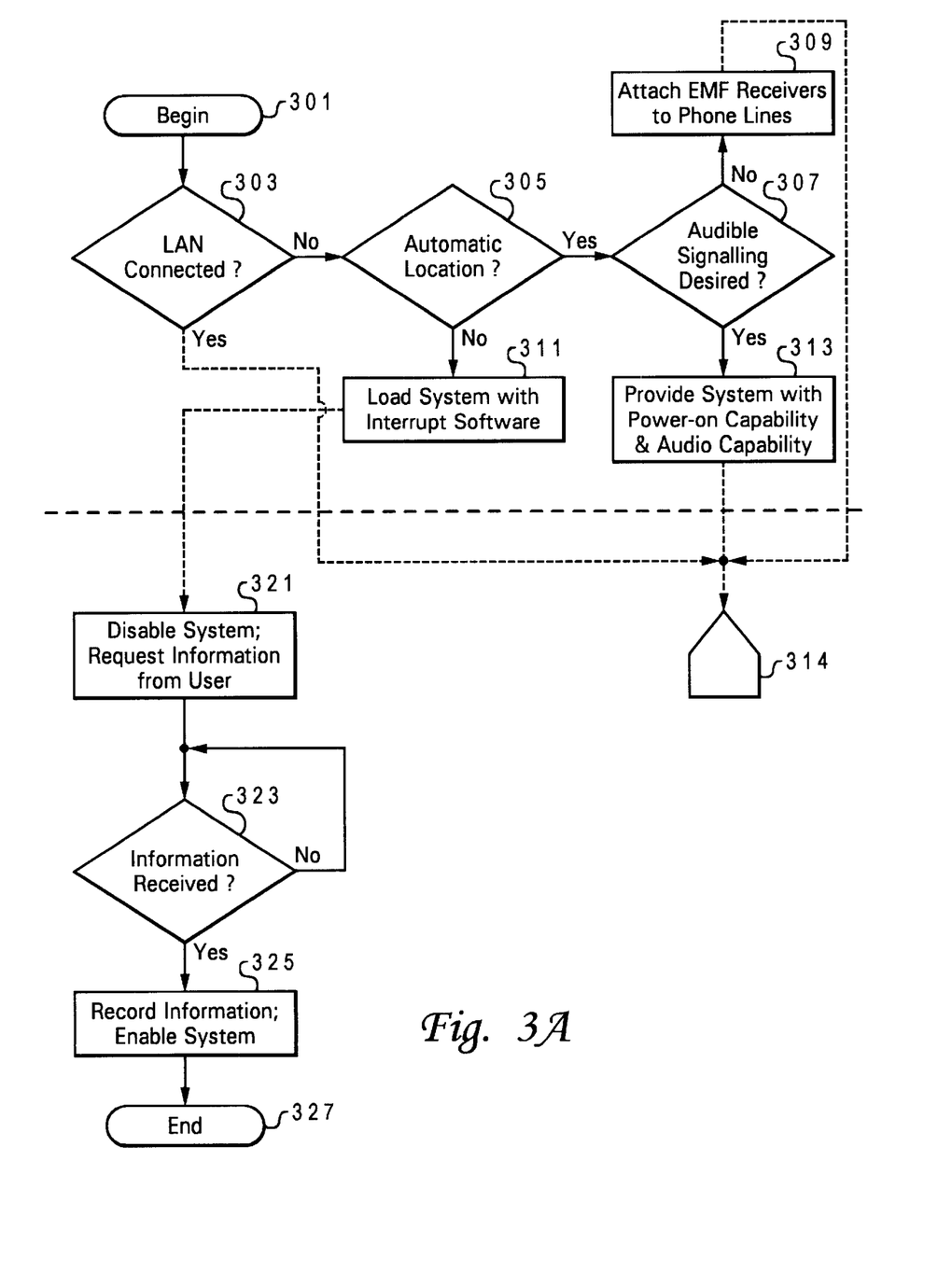
FIG. 3A depicts a high level flow chart which illustrates the administrative decision making steps and the process of detection and location of a data processing system utilizing resident interrupt software in accordance with one embodiment of the present invention.
Figure 3B:
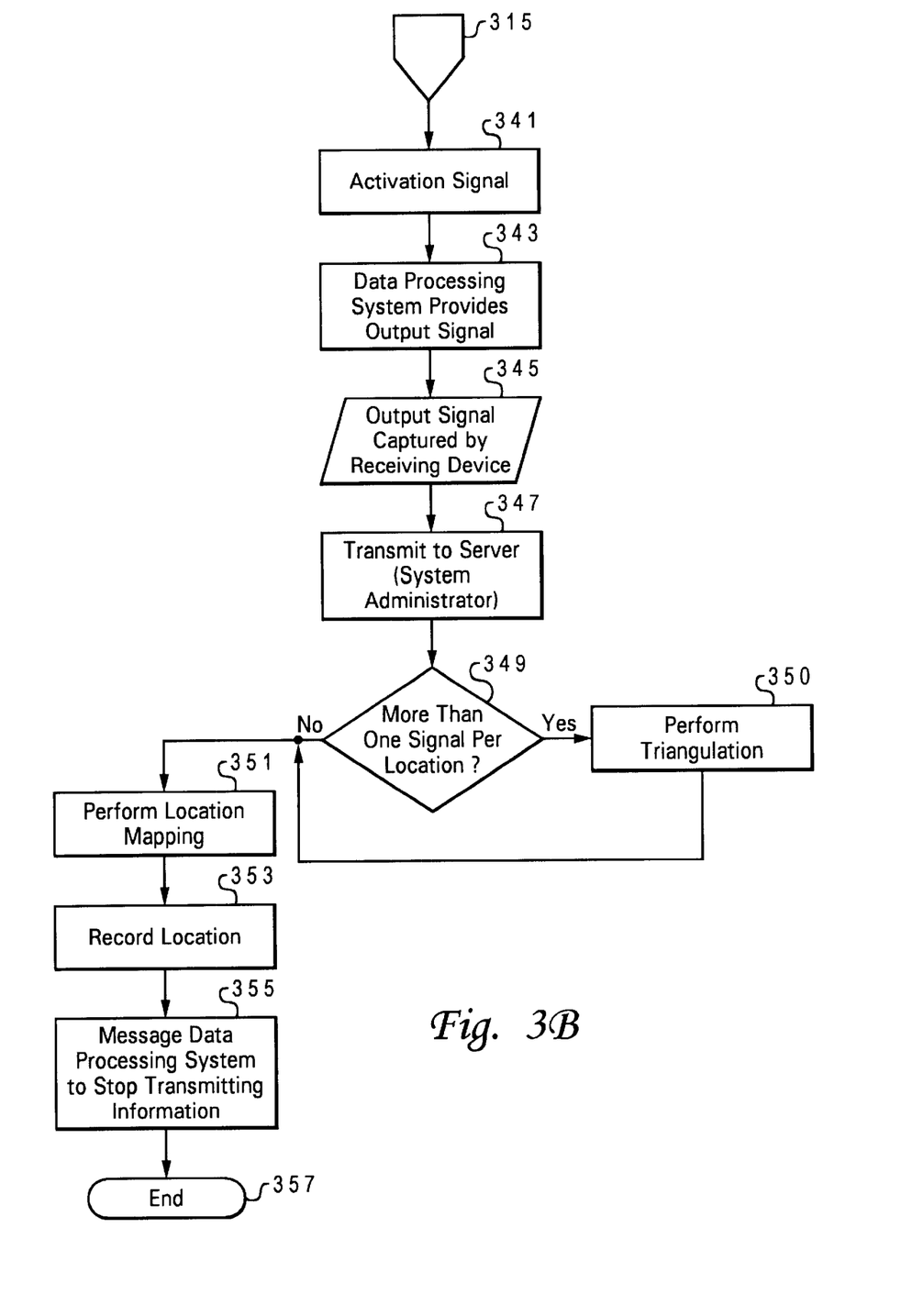
FIG. 3B depicts a high level flow chart which illustrates the process of detection and location of a data processing system via audible tones and EMF radiation in accordance with one embodiment of the present invention.

Returning now to the Figures and in particular to the FIG. 3A and FIG. 3B. FIG. 3A depicts the administrative steps required in determining which implementation of the invention is desired. The process begins (step 301) by first determining if the data processing systems located in the defined area are LAN connected (step 303). Often this step is bypassed because it is possible for a system to be taken off the LAN or for a new system to be brought in and not connected to that LAN. If the data processing systems are LAN connected, then the process transfers to the detection stage. If, however the data processing systems are not LAN connected, then a further check is made to determine if the system administrator requires an automated locating process (step 305). If an automated location process is not desired, then the data processing systems are loaded with an interrupt software (step 311). If an automated process is desired, then a further check is made to determine the type of detection mechanism preferred (step 307). Specifically, the system administrator determines if he wished to conduct the location process utilizing audible signalling via the phone system or EMF receivers. If audible signalling is desired the data processing systems are loaded with a power-on software and provided with audio capabilities (step 313). If audible signalling is not desired, then EMF signalling is desired and EMF receivers are attached to the phone lines (step 309). The process then passes to off-page connector (step 314).

Once a selection is made for an un-automated process of locating the data processing system (step 305) and the data processing system is loaded with interrupt software (step 311), the process of locating the system may proceed. The data processing system is disabled during utilization and the user is prompted to provide information (step 321). The user may provide the information in a variety of ways as is describe in Section B above. A check is made by the data processing system to determine if the user has provided the necessary information (step 323). Once the user has provided the information, the information is recorded by the system administrator and the data processing system is enabled (step 325). The process then ends (step 327).

FIG. 3B depicts the automated process of data processing system location utilizing one of the methods of detection. The process begins with on-page connector (step 315). An activation signal is sent (step 341). This is either sent by the server or is provided by an internal software of the data processing system or hardware component such as a timer. In response to the activation signal, the data processing system provides an output signal (step 343). Output signal may be an audible signal, an electronic signal, or an EMF radiation depending on the method of detection. Output signal is captured by the appropriate receiving device (step 345), and transmitted to the server (step 347). Server determines if more than one signal was received from a single location (step 349). If so, server performs triangulation (step 350) to determine the specific location of a particular data processing system. Once this is completed or when only one signal is received per location, server then performs location mapping (step 351). Then the location of the data processing system is recorded (step 353). The server then messages the data processing system to stop transmitting (step 355) and the process then ends (step 357).

While a preferred embodiment has been particularly shown and described, it will be understood by those skilled in the art that various changes in form and detail may be made therein without departing from the spirit and scope of the present invention. Accordingly, the description is to be understood as being a broad, teaching disclosure directed to persons of skill in the appropriate arts and not as limiting upon the present invention.

What is claimed is:

1. A system for mapping a location of electronic equipment in a defined area, said system comprising:

a processing unit, which comprises an electronic map of the physical layout of said defined area and an algorithm for mapping a physical location of each of said electronic equipment in said defined area utilizing a received signal from each of said electronic equipment and a known location of a monitoring device near said electronic equipment;

a plurality of monitoring devices with physical locations within said defined area that are known to said processor unit, wherein each of said monitoring devices is capable of communicating with said processing unit and receiving signals from any one of said electronic equipment that is located within a vicinity of said monitoring device and transmitting said signal to said processing unit;

means for triggering at least one of said electronic equipment, wherein said at least one electronic equipment is triggered to transmit a signal including a unique signature, which is sent to said processing unit matched with the identifier (ID) of the monitoring device having a known physical location within the vicinity of said electronic equipment; and means wherein said processing unit determines and records a physical location within said defined area of each of said electronic equipment utilizing the signal received from the electronic equipment and the physical location of the monitoring device within the vicinity of the electronic equipment.

2. The system of claim 1, wherein:

said electronic equipment is a data processing system and said processing unit is a server that is connected to said data processing system to create a local area network (LAN); and wherein further said unique signature of said emitting means includes an Internet Protocol (IP) address of said data processing system, and wherein said server and said data processing system communicates via said LAN utilizing said IP address.

3. The system of claim 2, wherein further said server messages said data processing system to stop transmitting said unique signature once said physical location is determined.

4. The system of claim 1, wherein:

said processing unit initiates a procedure to locate the electronic equipment by sending a trigger to said electronic equipment;

responsive to a receipt of said trigger from said processing unit, said electronic equipment emits said signal, and wherein said signal is captured by a monitoring device in vicinity of said electronic equipment; and said processing unit completes the determination and recordation by mapping which of said plurality of monitoring devices transmitted the signal corresponding to each of said electronic equipment.

5. The system of claim 2, wherein:

said monitoring devices include a plurality of individual units of a distributed phone network in said defined area; and said server comprises connection means to said phone network, messaging means for communicating with said electronic equipment via said phone network, means for receiving electronic messages via said phone network, said messages including said signal emitted by said electronic equipment, and means for analyzing said messages received via said telephone network to determine said location of said electronic equipment based on said unique signature in said signal and said location of said individual units of said phone network.

6. The system of claim 1, further comprising triangulation means, wherein a triangulation analysis is completed to determine a specific location of said electronic equipment when one or more of said electronic equipment is within a communication range of more than one of said monitoring devices.

7. The system of claim 1, wherein said monitoring devices comprise:

a plurality of phone units of a PBX phone network connected to said processing unit, wherein a location of each phone unit within said defined area is known, and said phone units are capable of being in a listening mode for said signal while on-hook;

means for communicating with said electronic equipment via said phone unit located within a predefined reference area of said electronic equipment; and means for receiving audible signals from said electronic equipment utilizing a listening function of said PBX phone unit while said phone unit is on-hook, said audible signals comprising tones correlated to specific characters which are decipherable to provide said unique signature.

8. The system of claim 2, wherein:

said monitoring devices comprise a plurality of electromagnetic frequency (EMF) receivers, wherein each of said receiver is able to communicate information to said processing unit and has a known physical location within said defined area;

said electronic equipment are data processing systems and comprise software resident on said data processing system allowing said data processing system to transmit an EMF signal utilizing an internal video display card, said EMF signal including a unique signature of said data processing system; and wherein said EMF receivers further comprise:
means for receiving said EMF signal with said unique signature and
means for transmitting said unique signature along with location indicia of said EMF receiver to said server, wherein a physical location of said data processing system within said defined area is determined using the transmitted signature and location indicia.

9. The system of claim 1, wherein said electronic equipment is a stand alone data processing system and said monitoring device is a PBX phone unit that is on-hook, said system further comprising:

a device associated with said data processing system that is utilized to wake up said data processing system; and means for activating said device via a particular phone ring and wake up said data processing system, wherein said data processing system transmits the signal by which its location is determined when said device is activated.

10. The system of claim 2, further comprising:

means for waking up said data processing system; and means for triggering a transmittal of said signal from said data processing system via a signaling method established from among audible and EMF signaling, wherein location indicia of the monitoring device is transmitted along with said signal.

11. The system of claim 1, wherein said electronic equipment is a stand alone data processing system that is equipped with a signaling mechanism that is detectable by said monitoring device and wherein further said data processing system is programed to automatically transmit said signal at a preset time and in response to an activation signal from said monitoring device.

12. The system of claim 7, further comprising:

means for ringing each telephone phone unit in a sequential manner, wherein a particular phone is made to ring and when a signal is received within a predetermined time after the particular phone rings, the electronic equipment associated with the unique signature is mapped to the physical location of the particular phone.

13. The system of claim 12, wherein said electronic equipment and said processing unit are components of a local area network (LAN) and transmission of said signal is completed from said electronic equipment to said processing unit via LAN connection.

14. The system of claim 7, wherein said electronic equipment and said processing unit are components of a local area network (LAN), said system further comprising:

means for sequentially triggered transmission of said signal by a LAN-routed signal from said processing unit to said electronic equipment, wherein said signal is transmitted via said monitoring device to said server and said server associates the unique signature of the received signal to electronic equipment triggered and the location of the monitoring device.

15. A method for mapping a location of an electronic equipment with audio capabilities in a defined area, said defined area containing a PBX phone network with individual phone units capable of being in a listening mode while on-hook and each having known physical locations, said method comprising the steps of:

triggering said electronic equipment to instantiate audible transmission of a unique signature of said electronic equipment, wherein said transmission is audible within a radius of said electronic equipment in which at least one of said individual phone units is located;

monitoring said defined area via said individual phone units for said unique signature;

determining which of said individual phone units heard said unique signature, wherein only particular phone units within said radius of said electronic equipment is capable of hearing said unique signature; and mapping the physical location of said electronic equipment to said known physical location of the individual phone unit that heard said unique signature.

16. The method of claim 15, wherein:

said electronic equipment is a data processing system that is connected to a network, said mapping is completed by a server of said network, and said unique signature transmitted includes an Internet Protocol (IP) address; and said method further comprises messaging via said IP address to said data processing system to stop transmitting said unique signature once a location of said data processing system is determined.

17. The method of claim 16, wherein said data processing system can decipher a particular phone ring and is programmed to transmit an audible signal containing its unique signature when said particular phone ring is heard, and wherein said triggering step includes the step of:

sequentially dialing the individual phone units to ring with said particular phone ring; and mapping the electronic equipment within said defined area based on a response received following each particular phone ring, wherein a next phone unit is dialed after a previous phone unit until all of said phone units in the defined area have been rung.

18. The method of claim 16, wherein said data processing system comprises audio recognition software capable of deciphering a particular phone ring while said data processing system is in a stand-by mode, wherein when said phone unit gives off said particular phone ring, and when said data processing system is in a stand-by mode, said data processing system is turned on by internal circuitry linked to said software and designed to turn said data processing system on in response to said particular phone ring, and said data processing system transmits an audible signal containing said unique signature of said data processing system.

19. The method of claim 15, wherein said PBX phone network comprises of a first unit and a second unit and wherein further when one or more of said electronic equipment is within communication range of more than one of said units, said mapping step further includes the step of determining a specific location of said electronic equipment utilizing triangulation.

20. The method of claim 16, said data processing system being a stand alone data processing system and further comprising:

providing a device to wake up said data processing system without connecting to said phone unit or said data processing system, wherein said device is tuned to listen for an audible phone ring, and contains a timer utilized to wake up said data processing system;

activating said device by providing said audible phone ring; and waking up said data processing system utilizing said device.

21. A computer program product for implementing a server function to map a location of an electronic equipment with audio capabilities in a defined area, said defined area containing a PBX phone network with individual phone units capable of being in a listening mode while on-hook and each having known physical locations, said program product comprising:

a computer readable medium; and program instructions for:

triggering said electronic equipment to instantiate audible transmission of a unique signature of said electronic equipment, wherein said transmission is audible within a radius of said electronic equipment in which at least one of said individual phone units is located;

monitoring said defined area via said individual phone units for said unique signature;

determining which of said individual phone units heard said unique signature, wherein only particular phone units within said radius of said electronic equipment is capable of hearing said unique signature; and mapping the physical location of said electronic equipment to said known physical location of the individual phone unit that heard said unique signature, wherein when one or more of said electronic equipment is within communication range of more than one of said phone units, said mapping instructions determines a specific location of said electronic equipment utilizing triangulation.

22. The computer program product of claim 21, wherein:

said electronic equipment is a data processing system that is connected to a network, said mapping is completed by a server of said network, and said unique signature transmitted includes an Internet Protocol (IP) address; and said program instructions further comprises instructions for messaging via said IP address to said data processing system to stop transmitting said unique signature once a location of said data processing system is determined.

* * * * *